US012134405B2

(12) United States Patent
Paxton et al.

(10) Patent No.: US 12,134,405 B2
(45) Date of Patent: Nov. 5, 2024

(54) RESPONDING TO UNSUPPORTED OR DEGRADED CONDITIONS FOR AUTONOMOUS VEHICLES

(71) Applicant: GM CRUISE HOLDINGS LLC, San Francisco, CA (US)

(72) Inventors: Tucker Allen Paxton, San Mateo, CA (US); Lucio Otavio Marchioro Rech, San Mateo, CA (US); Yang Tian, San Mateo, CA (US); Mikhail Chetin, Santa Cruz, CA (US)

(73) Assignee: GM CRUISE HOLDINGS LLC

( * ) Notice: Subject to any disclaimer, the term of this patent is extended or adjusted under 35 U.S.C. 154(b) by 312 days.

(21) Appl. No.: 17/724,013

(22) Filed: Apr. 19, 2022

(65) Prior Publication Data

US 2023/0331257 A1 Oct. 19, 2023

(51) Int. Cl.
*B60W 60/00* (2020.01)
*B60W 50/02* (2012.01)
*B60W 50/029* (2012.01)

(52) U.S. Cl.
CPC .... *B60W 60/0018* (2020.02); *B60W 50/0205* (2013.01); *B60W 50/029* (2013.01); *B60W 60/0011* (2020.02); *B60W 60/005* (2020.02); *B60W 2050/021* (2013.01); *B60W 2050/0292* (2013.01)

(58) Field of Classification Search
CPC .......... B60W 60/0018; B60W 60/005; B60W 60/0011; B60W 50/0205; B60W 50/029; B60W 2050/021; B60W 2050/0292
See application file for complete search history.

(56) References Cited

U.S. PATENT DOCUMENTS

| 10,496,090 | B2 * | 12/2019 | Latotzki | G05D 1/0246 |
| 2017/0124781 | A1 * | 5/2017 | Douillard | G08G 1/207 |
| 2018/0364701 | A1 * | 12/2018 | Liu | G05D 1/0027 |
| 2021/0271254 | A1 * | 9/2021 | Chen | G05D 1/0221 |

* cited by examiner

*Primary Examiner* — Gertrude Arthur Jeanglaude

(57) ABSTRACT

Disclosed are systems and methods for responding to unsupported or degraded conditions for autonomous vehicles (AVs). In some aspects, a method includes aggregating one or more trigger events generated across a software stack of an autonomous vehicle (AV) as aggregated trigger events, the one or more trigger events indicating at least one of unsupported or degraded conditions that bring the AV outside of allowable driving conditions of the AV, ranking the aggregated trigger events in accordance with priority levels corresponding to the aggregated trigger events, determining an AV maneuver to respond to a selected trigger event, wherein the selected trigger event is a highest ranked trigger event of the aggregated trigger events, causing the AV maneuver to be performed by the AV, and determining whether to at least one of fail the AV or recover the AV to a normal driving state in response to the selected trigger event.

19 Claims, 7 Drawing Sheets

500

Identify a highest priority trigger event of a set of aggregated trigger events, the trigger events corresponding to events that bring an autonomous vehicle (AV) outside of its normal driving abilities
510

Identify an AV maneuver associated with the highest priority trigger event
520

Responsive to the AV maneuver comprising an immediate stop maneuver or an immediate pullover maneuver, pass the AV maneuver to a primary planning system for processing
530

Responsive to the AV maneuver comprising a secondary stop maneuver, pass the AV maneuver to a secondary planning system for processing
540

Responsive to the AV maneuver comprising a hard stop maneuver, pass the AV maneuver to a hardware level stop system for processing
550

Initiate a session with remote assistance (RA) in response to the selected trigger event not causing an automatic failure of the AV and in response to the selected trigger event not allowing for an autonomous recovery of the AV
560

*FIG. 5*

RESPONDING TO UNSUPPORTED OR DEGRADED CONDITIONS FOR AUTONOMOUS VEHICLES

TECHNICAL FIELD

Embodiments described herein generally relate to the field of autonomous vehicles, and more particularly relate to responding to unsupported or degraded conditions for autonomous vehicles.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating driving safety. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

FIG. 5 illustrates an example method for determining an AV maneuver to respond to a trigger event for unsupported or degraded conditions of an autonomous vehicle.

DETAILED DESCRIPTION

Figure 1:
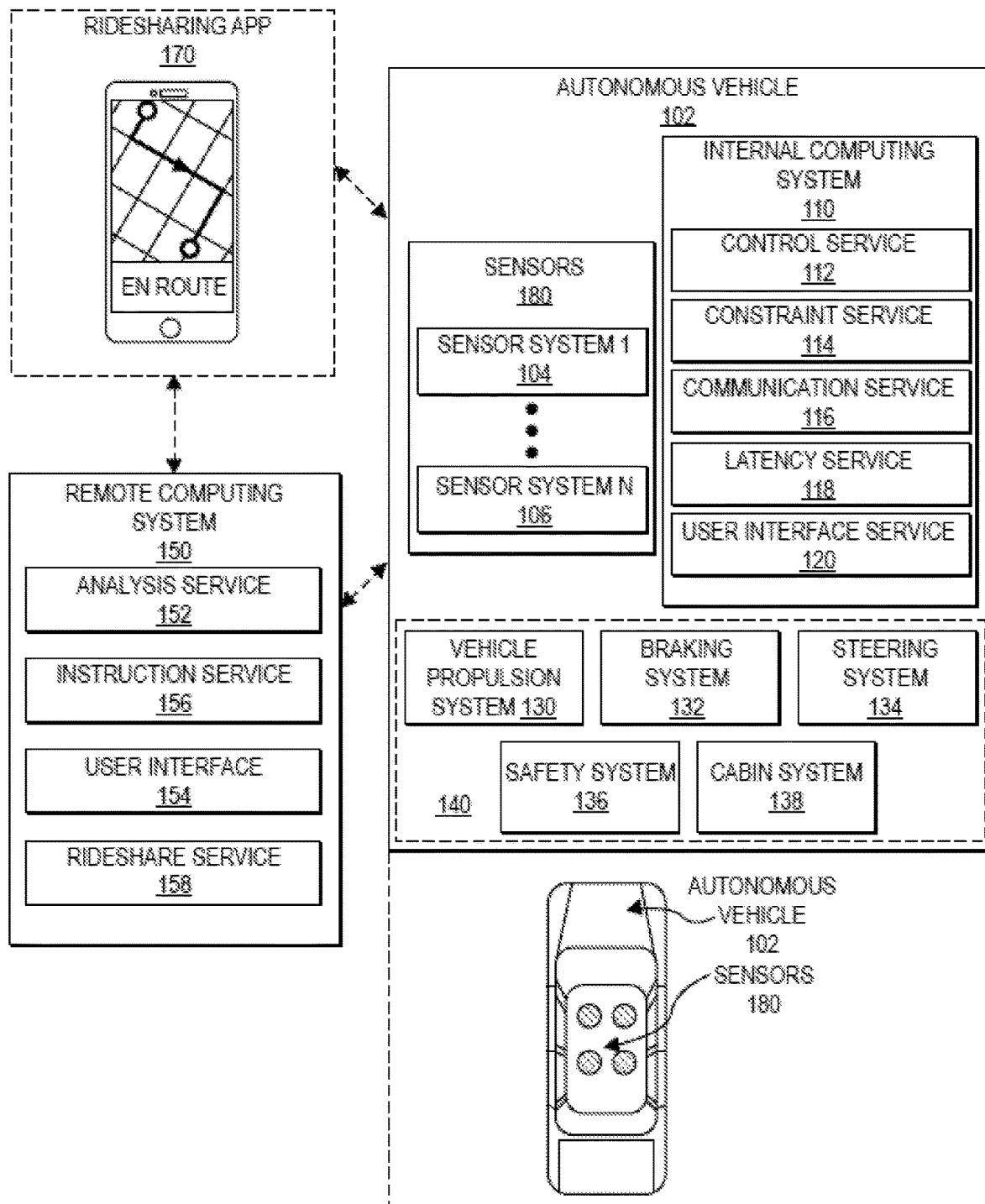
FIG. 1 illustrates an autonomous vehicle and remote computing system architecture in accordance with one embodiment.

Autonomous vehicles (AVs) can be implemented by companies to provide self-driving car services for the public, such as taxi or ride-haling (e.g., ride-sharing) services. In the course of operation, autonomous vehicles may encounter one or more unsupported and/or degraded conditions that take the autonomous vehicles outside of its normal driving operations and, in some cases, that the autonomous vehicles are not allowed to operate in. Examples of unsupported and/or degraded conditions can include hazardous weather conditions, collisions, software errors, exiting a range of a geographic fence (geofence) of the autonomous vehicles, cabin tampering, open doors, unbuckled seat belts, passenger end ride indications, cybersecurity integrity monitoring, and so on.

Some approaches to responding to unsupported and/or degraded conditions detected by an autonomous vehicle include performing a safe stop in the lane that the autonomous vehicle is currently driving in, regardless of the type of unsupported and/or degraded condition that is detected. As a result, these approaches can severely overreact to a minor event or may not react strongly enough to a more severe event.

Vehicle systems, apparatuses, and methods for responding to unsupported or degraded conditions for autonomous vehicles are described. In one example embodiment, one or more trigger events generated across a software stack of an autonomous vehicle can be aggregated as aggregated trigger events. The one or more trigger events can indicate at least one of unsupported or degraded conditions that bring the autonomous vehicle outside of allowable driving conditions of the autonomous vehicle. The aggregated trigger events may be ranked in accordance with priority levels corresponding to the one or more trigger events. An autonomous vehicle maneuver is identified to respond to a selected trigger event, where the selected trigger event includes the highest ranked trigger event of the aggregated trigger events. The autonomous vehicle maneuver is then caused to be performed by the autonomous vehicle (e.g., via a planning system of the autonomous vehicle). It is then determined whether to fail the autonomous vehicle or recover the autonomous vehicle to a normal driving state in response to the selected trigger event. Further details of the systems and methods for responding to unsupported or degraded conditions for autonomous vehicles are provided below with respect to FIGS. 1-7.

In the following description, for purposes of explanation, numerous specific details are set forth in order to provide a thorough understanding of the embodiments herein. It will be apparent, however, to one skilled in the art that the embodiments herein can be practiced without these specific details. In other instances, well-known structures and devices are shown in block diagram form in order to avoid obscuring the embodiments herein.

Reference in the specification to "one embodiment" or "an embodiment" means that a particular feature, structure or characteristic described in connection with the embodiment is included in at least one embodiment herein. Thus, the appearances of the phrase "in one embodiment" appearing in various places throughout the specification are not necessarily all referring to the same embodiment. Likewise, the appearances of the phrase "in another embodiment," or "in an alternate embodiment" appearing in various places throughout the specification are not all necessarily all referring to the same embodiment.

The following glossary of terminology and acronyms serves to assist the reader by providing a simplified quick-reference definition. A person of ordinary skill in the art may understand the terms as used herein according to general usage and definitions that appear in widely available standards and reference books.

FIG. 1 illustrates an autonomous vehicle and remote computing system architecture in accordance with one embodiment. The autonomous vehicle 102 can navigate about roadways without a human driver based upon sensor signals output by sensor systems 180 of the autonomous vehicle 102. The autonomous vehicle 102 includes a plurality of sensor systems 180 (e.g., a first sensor system 104 through an Nth sensor system 106). The sensor systems 180 are of different types and are arranged about the autonomous vehicle 102. For example, the first sensor system 104 may be a camera sensor system and the Nth sensor system 106 may be a Light Detection and Ranging (LIDAR) sensor system to perform ranging measurements for localization. Other example sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it should be understood that more or fewer sensors may be coupled to the autonomous vehicle 102.

Although variously described herein as an autonomous vehicle or another device collecting data of surrounding vehicles, this data may be collected without associated identifiable information from these surrounding vehicles (e.g., without license plate numbers, make, model, and color of the vehicles). Accordingly, the techniques mentioned herein can be used for the beneficial purposes described throughout but without the need to store potentially sensitive information of surrounding vehicles.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. In some cases, the braking system 132 may charge a battery of the vehicle through regenerative braking. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 180 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 180 and human co-pilots, etc.

The internal computing system 110 can include a control service 112 that is configured to control operation of a mechanical system 140, which includes vehicle propulsion system 130, the braking system 132, the steering system 134, the safety system 136, and the cabin system 138. The control service 112 receives sensor signals from the sensor systems 180 and communicates with other services of the internal computing system 110 to effectuate operation of the autonomous vehicle 102. In some embodiments, control service 112 may carry out operations in concert with one or more other systems of autonomous vehicle 102. The control service 112 can control driving operations of the autonomous vehicle 102 based on sensor signals from the sensor systems 180. In one example, the control service receives sensor signals to monitor driving operations and to determine localization of the vehicle. The control service determines lateral force disturbances for front and rear lateral accelerations and a bulk longitudinal force disturbance for the vehicle based on the localization and the sensor signals. The control service determines a tire road limit nearness estimation for the vehicle based on the sensor signals, the lateral force disturbances for front and rear lateral accelerations and a bulk longitudinal force disturbance.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 4G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions, etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make decisions or to provide the feedback.

The internal computing system 110 can also include a user interface service 120 that can communicate with cabin system 138 in order to provide information or receive information to a human co-pilot or human passenger. In some embodiments, a human co-pilot or human passenger may be utilized to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102 such as performing object detection for methods and systems disclosed herein. The analysis service 152 can also perform analysis pertaining to data associated with one or more errors or constraints reported by autonomous vehicle 102. In another example, the analysis service 152 is located within the internal computing system 110.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

The rideshare service 158 as depicted in FIG. 1 illustrates a vehicle 102 as a triangle en route from a start point of a trip to an end point of a trip, both of which are illustrated as circular endpoints of a thick line representing a route traveled by the vehicle. The route may be the path of the vehicle from picking up the passenger to dropping off the passenger (or another passenger in the vehicle), or it may be the path of the vehicle from its current location to picking up another passenger.

Figure 2:
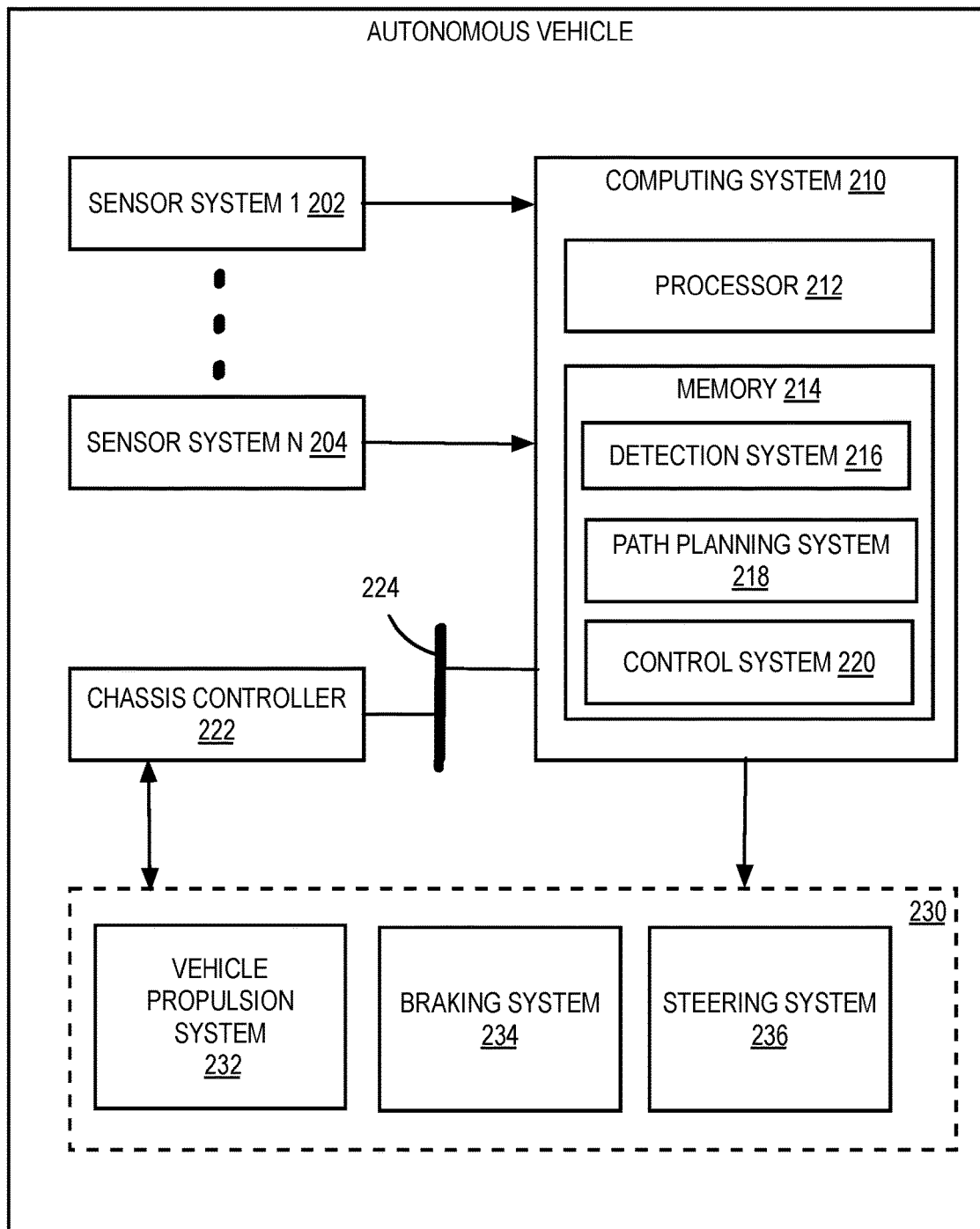
FIG. 2 illustrates an example autonomous vehicle in accordance with one embodiment.

FIG. 2 illustrates an example autonomous vehicle 200 in accordance with one embodiment. In one embodiment, autonomous vehicle 200 is the same as autonomous vehicle 102 described with respect to FIG. 1. The autonomous vehicle 200 can navigate about roadways without a human driver based upon sensor signals output by sensor systems 202-204 of the autonomous vehicle 200. The autonomous vehicle 200 includes a plurality of sensor systems 202-204 (a first sensor system 202 through an Nth sensor system 204). The sensor systems 202-204 are of different types and are arranged about the autonomous vehicle 200. For example, the first sensor system 202 may be a camera sensor system and the Nth sensor system 204 may be a lidar sensor system. Other example sensor systems include, but are not limited to, radar sensor systems, global positioning system (GPS) sensor systems, inertial measurement units (IMU), infrared sensor systems, laser sensor systems, sonar sensor systems, and the like. Furthermore, some or all of the of sensor systems 202-204 may be articulating sensors that can be oriented/rotated such that a field of view of the articulating sensors is directed towards different regions surrounding the autonomous vehicle 200.

The autonomous vehicle 200 further includes several mechanical systems that can be used to effectuate appropriate motion of the autonomous vehicle 200. For instance, the mechanical systems 230 can include but are not limited to, a vehicle propulsion system 232, a braking system 234, and a steering system 236. The vehicle propulsion system 232 may include an electric motor, an internal combustion engine, or both. The braking system 234 can include an engine break, brake pads, actuators, and/or any other suitable componentry that is configured to assist in decelerating the autonomous vehicle 200. The steering system 236 includes suitable componentry that is configured to control the direction of movement of the autonomous vehicle 200 during propulsion.

The autonomous vehicle 200 additionally includes a chassis controller 222 that is activated to manipulate the mechanical systems 230 when an activation threshold of the chassis controller 222 is reached.

The autonomous vehicle 200 further comprises a computing system 210 that is in communication with the sensor systems 202-204, the mechanical systems 230, and the chassis controller 222. While the chassis controller 222 is activated independently from operations of the computing system 210, the chassis controller 222 may be configured to communicate with the computing system 210, for example, via a controller area network (CAN) bus 224. The computing system 210 includes a processor 212 and memory 214 that stores instructions which are executed by the processor 212 to cause the processor 212 to perform acts in accordance with the instructions.

The memory 214 comprises a detection system 216, a path planning system 218, and a control system 220. The detection system 216 identifies objects in the vicinity (e.g., scene context) of the autonomous vehicle 200. The detection system 216 may analyze sensor signals generated by the sensor system 202-204 to identify the objects. Detection system 216 may also identify characteristics of the detected objects, such as distance, velocity, direction, and so on. In some embodiments, the detection system 216 implements one or more trained machine learning (ML) models for the object identification. In embodiments herein, detection system 216 can generate one or more trigger events corresponding to unsupported or degraded conditions experienced by the autonomous vehicle.

The path planning system 218 generates a path plan for the autonomous vehicle 200, wherein the path plan can be identified both spatially and temporally according to one or more impending timesteps. The path plan can include one or more maneuvers to be performed by the autonomous vehicle 200. In one embodiment, the path planning system 218 can respond to detected trigger events corresponding to unsupported or degraded conditions of the autonomous vehicle, in accordance with the techniques discussed herein.

The control system 220 is configured to control the mechanical systems (e.g., the vehicle propulsion system 232, the braking system 234, and the steering system 236) of the autonomous vehicle 200 based upon an output from the sensor systems 202-204 and/or the path planning system 218. For instance, the mechanical systems can be controlled by the control system 220 to execute the path plan determined by the path planning system 218. Additionally or alternatively, the control system 220 may control the mechanical systems 206-210 to navigate the autonomous vehicle 200 in accordance with outputs received from the sensor systems 202-204.

Figure 3:
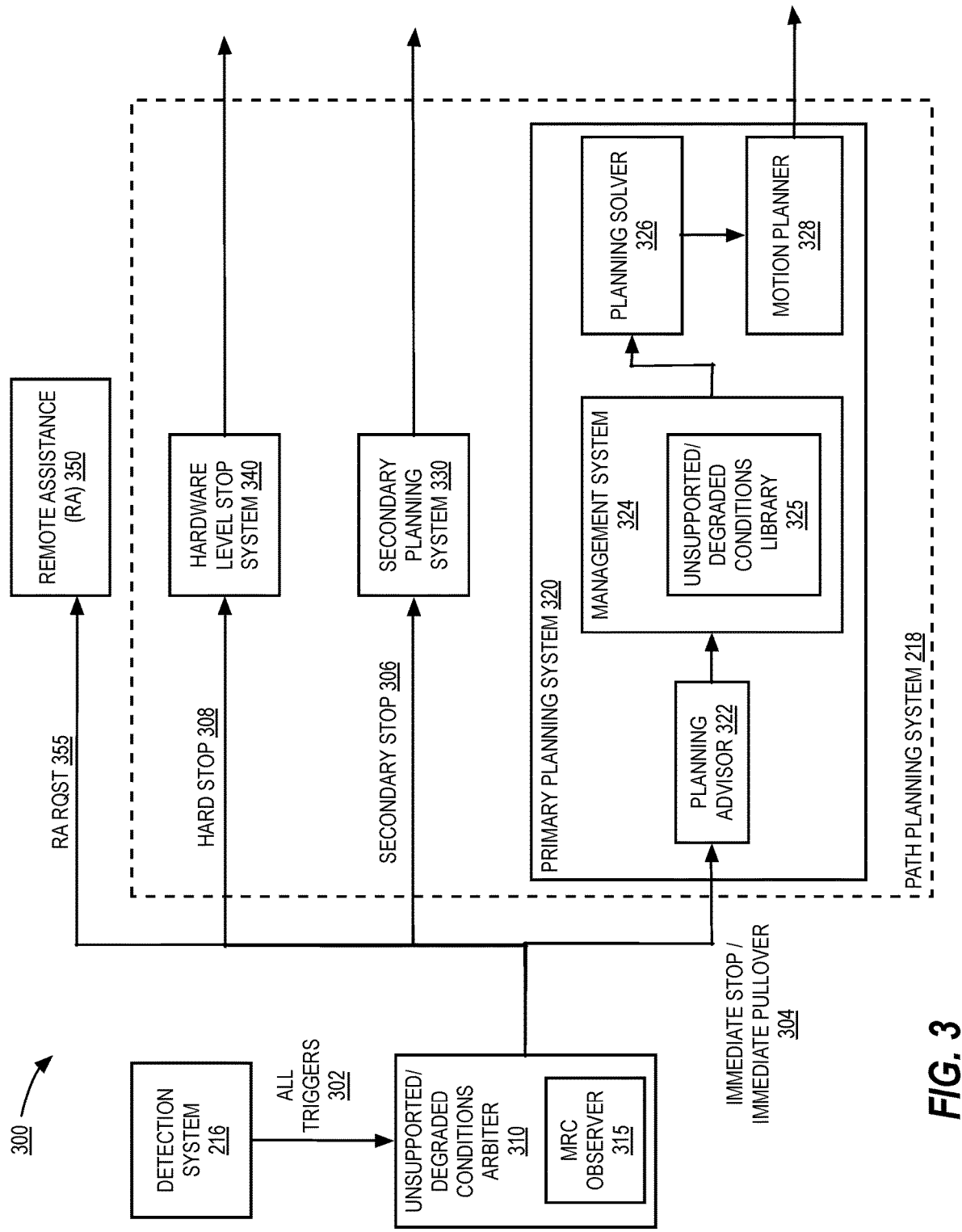
FIG. 3 illustrates an example unsupported or degraded condition response system, in accordance with embodiments herein.

FIG. 3 illustrates an example unsupported or degraded conditions response system 300 in accordance with embodiments herein. In one embodiment, the unsupported or degraded conditions response system 300 is implemented by an autonomous vehicle, such as autonomous vehicle 200 described with respect to FIG. 2. For example, unsupported or degraded conditions response system 300 may be implemented by a computing system, such as computing system 210 of autonomous vehicle 200 of FIG. 2, and can include the detection system 216 and path planning system 218 described with respect to FIG. 2.

Unsupported or degraded conditions response system 300 may also include an unsupported/degraded conditions arbiter 310 component and a remote assistance (RA) 350 component that are each communicably coupled to the detection system 216 and/or the path planning system 218 (may also be referred to herein as planning system). In embodiments herein, the unsupported/degraded conditions arbiter 310, as well as its sub-components, may be implemented by hardware, software, firmware and/or any combination of hardware, software and/or firmware of a computing system. In one embodiment, although not specifically illustrated, unsupported/degraded conditions arbiter 310 can be hosted by the detection system 216 or path planning system 218 described with respect to FIG. 2. In some embodiments, unsupported/degraded conditions arbiter 310 is hosted separately from the detection system 216 or path planning system 218 within the unsupported or degraded conditions response system 300.

Although not specifically illustrated, RA 350 may be communicably coupled to the detection system 216 in some embodiments. In one embodiment, a network may be used to communicably couple the RA 350 with the components of the autonomous vehicle, such as to path planning system 218, detection system 216, and/or unsupported/degraded conditions arbiter 310. In one embodiment, RA 350 may be hosted by the remote computing system 150 described with respect to FIG. 1, and may include the analysis service 152 and the instruction service 156 of FIG. 1.

For purposes of the description herein, an unsupported or degraded condition may refer to conditions and/or events that take the autonomous vehicle outside of its normal driving operations and, in some cases, include conditions and/or events in which the autonomous vehicle is not allowed to operate in. Examples of unsupported and/or degraded conditions can include hazardous and/or other predetermined weather conditions, collisions (ranging from minor to severe), software errors, exiting a range of a geographic fence (geofence) of the autonomous vehicle, cabin tampering, open doors, unbuckled seat belts, passenger end ride indications, cybersecurity integrity monitoring, and so on.

In embodiments herein, unsupported or degraded conditions response system 300 can respond to unsupported or degraded conditions that are detected by the unsupported or degraded conditions response system 300. Detection system 216 may monitor and/or receive one or more signals from across a software stack of the autonomous vehicle. For example, the detection system 216 can monitor signals generated by various systems of the autonomous vehicle, including perception systems, planning systems, remote assistance (RA) systems, and so on. The signals may be internal or external to the autonomous vehicle. For example, the signals may include sensor signals, such as audio signals, video signals, other sensor signals (e.g., RADAR, LIDAR, etc.), and so on, from one or more sensor systems of the autonomous vehicle. Detection system 216 may monitor for internal events of the autonomous vehicle, such as a software errors or other internal events, such as cabin tampering, doors opening, seatbelts unbuckled, passenger end ride indication (e.g., pressing a stop ride button in the cabin of the autonomous vehicle prior to the planned end of ride), and so on. Furthermore, detection system 216 may monitor for external events, such as hazardous weather, collisions, exiting a geographic fence (geofence) of the autonomous vehicle, and so on. The detection system 216 may generate trigger events that indicate the occurrence of one or more of these internal and/or external events corresponding to unsupported or degraded conditions of the autonomous vehicle.

The detection system 216 may be coupled to the unsupported/degraded conditions arbiter 310 and can provide the detected trigger events 302 to the unsupported/degraded conditions arbiter 310. The unsupported/degraded conditions arbiter 310 is configured to aggregate (or collect, receive, etc.) the trigger events (that indicate the unsupported or degraded conditions of the autonomous vehicle) detected at detection system 216. In some embodiments, one or more trigger events may be aggregated, collected, or received. The unsupported/degraded conditions arbiter 310 can monitor for the trigger events and latch all trigger events into a single location (e.g., memory or data structure) managed by the unsupported/degraded conditions arbiter 310. In one embodiment, the unsupported/degraded conditions arbiter 310 may latch all trigger events that occur during a processing cycle (e.g., a clock "tick") of the autonomous vehicle.

In one embodiment, the unsupported/degraded conditions arbiter 310 can rank the aggregated trigger events in accordance with priority levels corresponding to the one or more trigger events. The priority levels may be determined priority levels associated with the trigger events by the unsupported or degraded conditions response system 300 (e.g., by the detection system 216 and/or by unsupported/degraded conditions arbiter 310). For example, the determined priority levels may be hardcoded priority levels that are associated with the trigger events in unsupported or degraded conditions response system 300.

The unsupported/degraded conditions arbiter 310 may then identify and/or select a highest ranked trigger event from the aggregated trigger events. This selected trigger event is then processed by unsupported/degraded conditions arbiter 310 to determine an autonomous vehicle maneuver (AV maneuver) to perform in response to the selected trigger event. The determined autonomous vehicle maneuver is then passed to the path planning system 218, which can cause the autonomous vehicle to perform the determined autonomous vehicle maneuver. In one example embodiment, the path planning system 218 may include a primary planning system 320, a secondary planning system 330, and/or a hardware level stop system 340. In some embodiments, path planning system 218 may include more or less components (e.g., planning systems) than illustrated and described herein, and is not limited to the architectures described herein.

In embodiments herein, there can be multiple possible autonomous vehicle maneuvers that the autonomous vehicle may perform in response to various trigger events. In one embodiment, each trigger event can be associated with a particular autonomous vehicle maneuver that should be performed in response to that trigger event.

In some embodiments, the unsupported/degraded conditions arbiter 310 may be hardcoded with the specific autonomous vehicle maneuver to perform in response to each trigger event that can occur in the autonomous vehicle. In one embodiment, the autonomous vehicle maneuvers can include, but are not limited to, an immediate pullover 304, an immediate stop 304, a secondary stop 306, and a hard stop 308.

In one embodiment, the immediate stop and immediate pullover 304 autonomous vehicle maneuvers invoke the primary planning system 320. An immediate pullover refers to the autonomous vehicle pulling over at a closest acceptable location. An immediate stop refers to the autonomous vehicle stopping as quickly as possible in place in the lane it is currently operating in without leaving the lane boundary. The immediate stop can consider external factors, such as preventing collisions from behind, in its stopping behavior.

The secondary stop 306 invokes the secondary planning system 330 of the autonomous vehicle, which is a fallback planning stack/perception stack operating on the autonomous vehicle. The secondary planning system 330 is a smaller planning system than the primary planning system 320 and, while less capable of full autonomous driving, can be simple and capable of reflexive driving such that it can bring the autonomous vehicle to a stop, can avoid collisions, and can have intelligence to exit out of dangerous areas such as intersections. In one embodiment, the secondary stop 306 autonomous vehicle maneuver may invoke the secondary planning system 330 for situations where the primary planning system 320 has failed and/or is no longer operable (e.g., software error causes primary planning system 320 to crash, primary planning system 320 has detected it is in an invalid state and cannot fix itself, etc.).

The hard stop 308 invokes the hardware level stop system 340 of the autonomous vehicle. The hard stop 308 is the most severe stopping option of the possible autonomous vehicle maneuvers and is utilized in cases where there is no information on the status of the autonomous vehicle and/or the other planning systems (e.g., primary planning system 320, secondary planning system 330) or the autonomous vehicle are not responsive or operational. The hard stop 308 may include the hardware level stop system 340 causing the autonomous vehicle to immediately apply brakes in place as quickly as possible (without regard to any external factors) and locking the steering of the autonomous vehicle.

In some embodiments herein, other autonomous vehicle maneuvers than those discussed above can be implemented by the autonomous vehicle in a more granular manner. For example, the primary planning system 320 may receive an immediate stop or pullover 304 signal from the unsupported/degraded conditions arbiter 310 and can generate a specific response to that signal. As illustrated, in one embodiment, the primary planning system 320 may include a planning advisor 322, a management system 324, a planning solver 326, and a motion planner 328. In embodiments herein, the planning advisor 322, the management system 324, the planning solver 326, and/or the motion planner 328, as well as their sub-components, may be implemented by hardware, software, firmware and/or any combination of hardware, software and/or firmware of a computing system.

The planning advisor 322 may analyze the immediate stop or pullover 304 signal to determine how to respond to the selected trigger event for the unsupported or degraded condition. For example, the planning advisor 322 may determine that an RA session should be initiated with RA 350 as part of responding to the selected trigger event. The planning advisor 322 may further determine that the management system 324 can autonomously determine a response to the selected trigger event. The management system 324 may then determine how to respond to the selected trigger event and encode a representation of that response to provide to lower-level planning systems of the autonomous vehicle, such as the planning solver 326 and motion planner 328.

The management system 324 may utilize the immediate stop or pullover 304 signal, as well as the additional information regarding contextual elements of the autonomous vehicle scene corresponding to the immediate stop or pullover 304 signal, in order to formulate a response to the selected trigger event. In embodiments herein, the management system 324 can encode a representation of the response to provide to the planning solver 326. For example, the representation of the response may be in a Robot Operating System (ROS) message format. The representation of the response provides an intent of the response of the autonomous vehicle within an interface that is suitable for the lower-level planner systems to generate and evaluate candidate solutions (e.g., trajectories) to effectuate the actual autonomous vehicle response. As such, the representation is an expression of autonomous vehicle response intent, rather than a specific trajectory or directives for the autonomous vehicle to follow.

In one embodiment, the representation may be referred to as a scenario. The scenario may include requirements (e.g., parameters) of behaviors of the autonomous vehicle in responding to the selected trigger event. The requirements (parameters) may include, for example, an identifier, a priority, one or more goals, an urgency, and/or behavioral flag(s). The priority may indicate an overriding priority to utilize for ranking the scenario against other scenarios received by the lower-level planning systems. The goals may outline constraints on the end state of the scenario such as, for example, whether the autonomous vehicle should stop, inclusion and exclusion regions for the end state, whether to use hazard lights, and/or behavior after coming to a stop (e.g., shift to park, apply emergency brake, etc.). The urgency may indicate how urgent the goal is and can influence details (e.g., how much braking to incur, how hard to brake, etc.) of how the lower-level planning systems cost and solve for trajectories to enable the scenario. The behavioral flags may include keep clear (directive to keep clear of all intersections (e.g., do not stop in an intersection)), tight waypoint following (e.g., the autonomous vehicle keeping within a threshold distance of an indicated waypoint), reverse allowed, conservative rear time to clear (e.g., rear end risk; maintaining a threshold distance from objects at the rear of the autonomous vehicle), creeping (e.g., autonomous vehicle is allowed to move slowly to obtain a directive), and so on.

In one embodiment, the management system 324 may include an unsupported/degraded conditions library 325 to reference in order to determine which requirements (parameters) and flags should be encoded in the scenario in response to the selected trigger event. For example, the unsupported/degraded conditions library 325 may indicate what priority values, urgency values, goal parameters, behavioral flags to set (based on the contextual elements of the unsupported/degraded condition of the selected trigger event) in order to indicate a particular response intent in the scenario generated by the management system 324.

In some embodiments, the unsupported/degraded conditions library 325 may map the contextual information of a detected unsupported/degraded condition of the selected trigger event to the parameters that are set in the scenario. For example, the parameters may allow for stopping without allowing high severity braking, stopping without allowing collisions, stopping without allowing stopping in intersections, allowing stopping in a particular region, not allowing stopping in a particular region, and so on.

Parameters for various scenarios that can be generated based on the detected unsupported/degraded condition of the selected trigger event and the contextual information of a current scene of the autonomous vehicle can be maintained in the unsupported/degraded conditions library 325. Furthermore, the unsupported/degraded conditions library 325 may indicate other options for potential scenarios, such as options for lateral road clearance to maintain in a scenario, fallback behaviors that are allowed, options for single lane roads versus multi-lane roads, options for one-way roads, options for biasing within a lane or out of a lane, options for autonomous vehicle hazards and turn signal light usage, options for parking brake usage, and so on.

Once generated, the scenario can be passed to the planning solver 326. In one embodiment, the planning solver 326 may be a non-convex solver (NCS) capable of receiving a scenario and computing a corresponding trajectory to satisfy the scenario. Other types of planning solvers 326 may also be utilized in embodiments herein. In one embodiment, the planning solver 326 may utilize the parameters provided in the scenario (e.g., priority, goals, urgency, behavioral flags, etc.) to generate multiple different possible trajectory solutions that can satisfy the scenario and may generate a cost for each of the possible trajectory solutions. The planning solver 326 may then utilize a cost function optimization approach to select one of the possible trajectory solutions to output as an optimum or acceptable trajectory for the autonomous vehicle.

In one embodiment, the planning solver 326 passes the trajectory to the motion planner 328. The motion planner 328 may determine a series of waypoints, velocities, and/or accelerations, for example, that the autonomous vehicle should take for the provided trajectory. The motion planner 328 can provide autonomous vehicle actuation directives to the control system (e.g., control system 220 of FIG. 2) to cause the mechanical systems of the autonomous vehicle to effectuate appropriate motion of the autonomous vehicle in order to respond to the detected unsupported/degraded conditions of the selected trigger event as indicated by the generated scenario.

In embodiments herein, the determined autonomous vehicle maneuver effectuated by the path planning system 218 responsive to the trigger event causes the autonomous vehicle to achieve a minimal risk condition (MRC). The MRC refers to a state of the autonomous vehicle where the autonomous vehicle is not in motion, the gear of the autonomous vehicle is shifted to park, and hazard lights of the autonomous vehicle are engaged. The MRC observer 315 of the unsupported/degraded conditions arbiter 310 may monitor the autonomous vehicle to determine when the autonomous vehicle has achieved MRC.

Once (or concurrent with) the autonomous vehicle achieves (achieving) MRC, the unsupported/degraded conditions arbiter 310 can determine whether the autonomous vehicle should automatically fail (e.g., enter a failure state where the autonomous vehicle is stopped, put into a parked gear, applies the emergency brake, and prevented from moving until an external entity intercedes and re-initiates the autonomous vehicle), whether the autonomous vehicle should autonomously recover from the selected trigger event, and/or whether a session with RA 350 should be initiated.

In some embodiments, the selected trigger event can cause the autonomous vehicle to automatically fail (e.g., enter a failed or failure state). For example, severe collisions where recovery is not possible or a severe software error that cannot be recovered from may cause an automatic failure of the autonomous vehicle. Furthermore, if the secondary planning system 330 is invoked for a secondary stop 306, this may cause an automatic failure of the autonomous vehicle. Similarly, if the hardware level stop system 340 is invoked for a hard stop 308, this may cause an automatic failure of the autonomous vehicle. When the autonomous vehicle fails, it is rendered inoperable and cannot move on its own. As such, a failure of the autonomous vehicle may result in an in-person retrieval of the autonomous vehicle. In one embodiment, the unsupported/degraded conditions arbiter 310 may cause the autonomous vehicle to fail in response to the selected trigger event automatically invoking a failure state. In some embodiment, the path planning system 218 may cause the autonomous vehicle to fail in response to the selected trigger event automatically invoking a failure state.

In some embodiments, the selected trigger event is an event that allows for autonomous recovery of the autonomous vehicle (e.g., without contacting RA 350) to a normal driving state (e.g., resuming the planned navigation path of the autonomous vehicle). For example, if the unsupported/degraded condition is a software-related trigger event from which the autonomous vehicle automatically recovered, the autonomous vehicle can determine that the selected trigger event is no longer occurring and the software is performing well, and can decide to resume normal driving operations without initiating a session with the RA 350. In some embodiments, a determined set of trigger events can be classified as trigger events from which the autonomous vehicle can autonomously recover. An autonomous recovery may refer to an ability of the autonomous vehicle to address and resolve a trigger event without interaction with an external entity, such as the RA 350. For example, an autonomous vehicle may attempt to autonomously recover from a software failure by executing a recovery software routine and/or restarting the failed software.

The unsupported/degraded conditions arbiter 310 and/or the path planning system 218 may be aware of the determined set of trigger events that allow for autonomous recovery and may process such trigger events accordingly. Recovering the autonomous vehicle may include clearing the MRC, which causes the autonomous vehicle to return to a normal driving state where the autonomous vehicle can shift its gears to drive and resume its route.

In one example embodiment, the autonomous vehicle may include a health monitoring system (not shown) that can send signals from portions of the software stack of the autonomous vehicle regarding the degraded state causing such a trigger event. After achieving an MRC in response to such a trigger event, the unsupported/degraded conditions arbiter 310 and/or the path planning system 218 may determine that there is no signal being sent from the health monitoring system and assume that the degraded state is no longer occurring. If there are no other trigger events, then the normal driving state of the autonomous vehicle can be resumed autonomously.

In one embodiment, as discussed above, the unsupported/degraded conditions arbiter 310 may determine that assistance from the RA 350 should be requested for the selected trigger event. In one embodiment, unless the selected trigger event causes an automatic failure of the autonomous vehicle or allows for autonomous recovery of the autonomous vehicle, the unsupported/degraded conditions arbiter 310 can reach out to the RA 350 to establish a session with the RA. In one embodiment, the unsupported/degraded conditions arbiter 310 sends an RA request (RA rqst) 355 to the RA 350 to establish the session with the RA.

Once sent to the RA 350, the RA request 355 may cause the autonomous vehicle to enter into an RA session with the RA 350 where an interface is established between the autonomous vehicle and the RA 350. The interface allows the RA 350 to review the selected trigger event and the determined autonomous vehicle maneuver 304-308, and allows the RA 350 to provide directives and/or feedback to the autonomous vehicle with respect to the autonomous vehicle maneuver 304-308.

In one embodiment, based on review of the selected trigger event and determined autonomous vehicle maneuver, including review of a current scene context of the autonomous vehicle, the RA 350 can provide a fail signal or a recovery signal to the autonomous vehicle. The fail signal can cause the autonomous vehicle to fail (e.g., rendered inoperable and cannot move on its own). The recovery signal can clear the selected trigger that caused the autonomous vehicle to come to a stop. In some embodiments, the RA can provide guidance to the autonomous vehicle to maneuver to the stop. As noted above, recovering the autonomous vehicle may include clearing the MRC, which causes the autonomous vehicle to return to a normal driving state where the autonomous vehicle can shift its gears to drive and resume its route.

Figure 4:
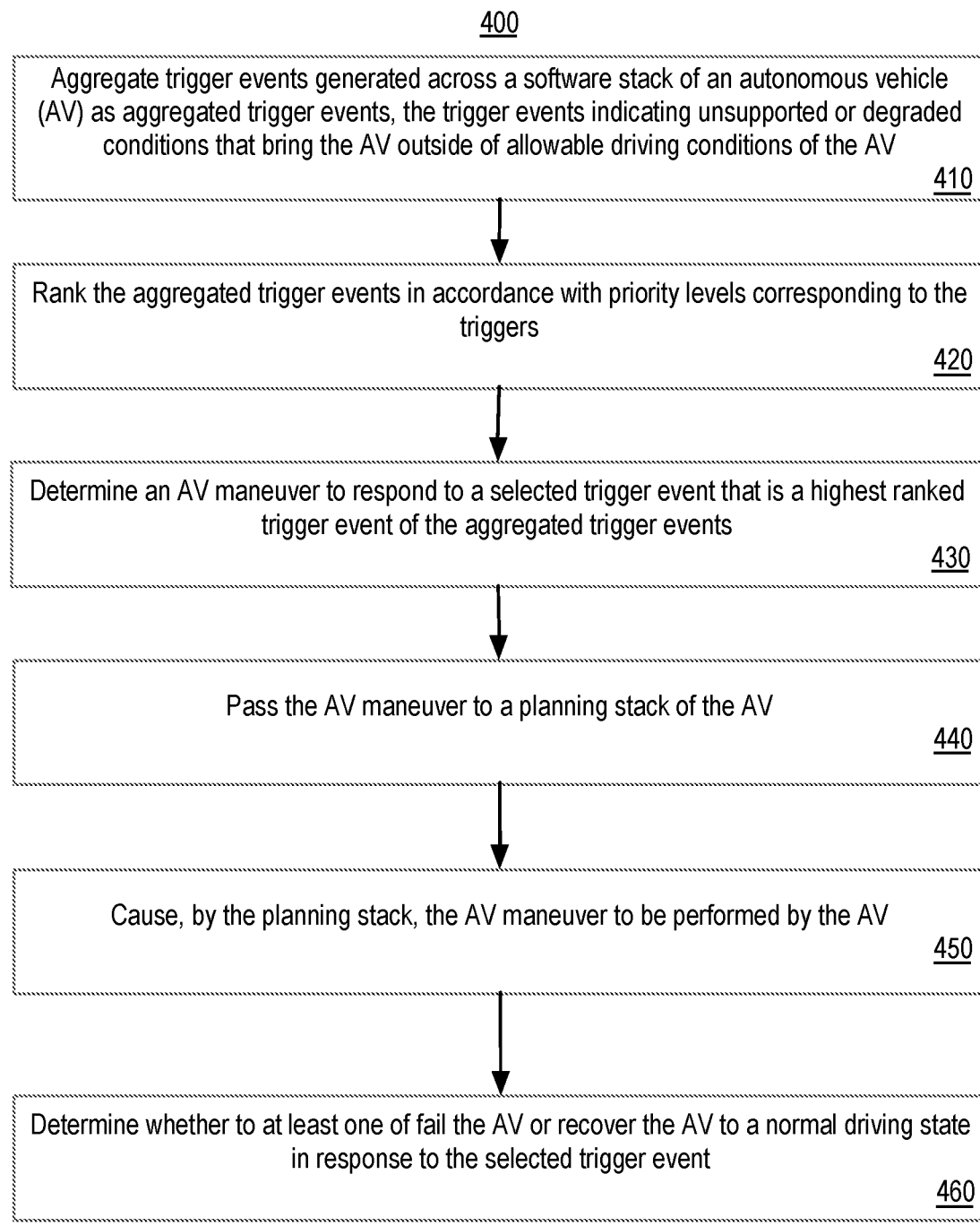
FIG. 4 illustrates an example method for responding to unsupported or degraded conditions of an autonomous vehicle.

FIG. 4 illustrates an example method 400 for responding to unsupported or degraded conditions of an autonomous vehicle. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some embodiments, the method 400 includes block 410 where trigger events generated across a software stack of an autonomous vehicle are aggregated as aggregated trigger events. In one embodiment, the trigger events indicate unsupported or degraded conditions that bring the autonomous vehicle outside of allowable driving conditions of the autonomous vehicle. In some embodiments, the trigger events include one or more of determined weather conditions, collisions, software errors, exiting a range of a geographic fence of the autonomous vehicle, cabin tampering, open doors, unbuckled seat belts, passenger end ride indications, or cybersecurity integrity monitoring, to name a few examples.

At block 420, the aggregated trigger events are ranked in accordance with priority levels corresponding to the triggers. The priority levels may be determined priority levels associated with the trigger events in the autonomous vehicle. For example, the determined priority levels may be hard-coded priority levels that are associated with the trigger events in the autonomous vehicle. Then, at block 430, an autonomous vehicle maneuver is determined. The determined autonomous vehicle maneuver is to respond to a selected trigger event that is the highest ranked trigger event of the aggregated trigger events. In one embodiment, the determined autonomous vehicle maneuver is one of multiple autonomous vehicle maneuvers that could be performed for various trigger events. The autonomous vehicle maneuver may be hardcoded in the autonomous vehicle as a response to the particular trigger event. In one embodiment, the autonomous vehicle maneuver may be at least one of an immediate stop, an immediate pullover, a secondary stop, or a hard stop, for example.

At block 440, the autonomous vehicle maneuver is passed to a planning stack of the autonomous vehicle. In one embodiment, the planning stack may include one or more planning systems (e.g., primary planning system, secondary planning system, hardware level stop system, etc.) to handle the autonomous vehicle maneuvers. Subsequently, at block 450, the planning stack of the autonomous vehicle causes the autonomous vehicle maneuver to be performed by the autonomous vehicle.

Lastly, at block 460, it is determined whether to at least one of fail the autonomous vehicle or recover the autonomous vehicle to a normal driving state in response to the selected trigger event. In one embodiment, the autonomous vehicle is automatically failed for a set of determined trigger event. In one embodiment, a fail signal from an RA session may cause the autonomous vehicle to fail. The autonomous vehicle may also autonomously recover from a set of determined trigger events or may recover based on the recovery signal received from the RA session.

FIG. 5 illustrates an example method 500 for determining an autonomous vehicle maneuver to respond to a trigger event for unsupported or degraded conditions of an autonomous vehicle. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method 500 includes block 510 where the highest priority trigger event of a set of aggregated trigger events is identified. In one embodiment, the trigger events corresponds to events that bring the autonomous vehicle outside of its normal driving abilities. For example, the trigger events indicate unsupported or degraded conditions that bring the autonomous vehicle outside of allowable driving conditions of the autonomous vehicle. In some embodiments, the trigger events include one or more of determined weather conditions, collisions, software errors, exiting a range of a geographic fence of the autonomous vehicle, cabin tampering, open doors, unbuckled seat belts, passenger end ride indications, or cybersecurity integrity monitoring, to name a few examples.

At block 520, an autonomous vehicle maneuver is identified that is associated with the highest priority trigger event. The determined autonomous vehicle maneuver is to respond to a selected trigger event that is the highest ranked trigger event of the aggregated trigger events. In one embodiment, the determined autonomous vehicle maneuver is one of multiple autonomous vehicle maneuvers that could be performed for various trigger events. The autonomous vehicle maneuver may be hardcoded in the autonomous vehicle as a response to the particular trigger event. In one embodiment, the autonomous vehicle maneuver may be at least one of an immediate stop, an immediate pullover, a secondary stop, or a hard stop, for example.

Then, at block 530, responsive to the autonomous vehicle maneuver comprising an immediate stop maneuver or an immediate pullover maneuver, the autonomous vehicle maneuver is passed to a primary planning system for processing. An immediate pullover refers to the autonomous vehicle pulling over at a closest acceptable location. An immediate stop refers to the autonomous vehicle stopping as quickly as possible in place in the lane it is currently operating in without leaving the lane boundary. The immediate stop can consider external factors, such as preventing collisions from behind, in its stopping behavior.

At block 540, responsive to the autonomous vehicle maneuver comprising a secondary stop maneuver, the autonomous vehicle maneuver is passed to a secondary planning system for processing. The secondary planning is a fallback planning stack/perception stack operating on the autonomous vehicle. The secondary planning system is a smaller planning system than the primary planning system and, while less capable of full autonomous driving, can be simple and capable of reflexive driving such that it can bring the autonomous vehicle to a stop, can avoid collisions, and can have intelligence to exit out of dangerous areas such as intersections. In one embodiment, the secondary stop autonomous vehicle maneuver may invoke the secondary planning system for situations where the primary planning stack has failed and/or is no longer operable (e.g., software error causes primary planning system to crash, primary planning system has detected it is in an invalid state and cannot fix itself, etc.).

At block 550, responsive to the autonomous vehicle maneuver comprising a hard stop maneuver, the autonomous vehicle maneuver is passed to a hardware level stop system for processing. The hard stop invokes the hardware level stop system of the autonomous vehicle. The hard stop may be the most severe stopping option of the possible autonomous vehicle maneuvers and is utilized in cases where there is no information on the status of the autonomous vehicle and/or the other planning systems (e.g., primary planning system, secondary planning system) of the autonomous vehicle are not responsive or operational. The hard stop may include the hardware level stop system causing the autonomous vehicle to immediately apply brakes in place as quickly as possible (without regard to any external factors) and locking the steering of the autonomous vehicle.

Lastly, at block 560, a session is initiated with RA in response to the selected trigger event not causing an automatic failure of the autonomous vehicle and in response to the selected trigger event not allowing for an autonomous recovery of the autonomous vehicle. In one embodiment, the session with the RA may cause either failure of the autonomous vehicle or a recovery of the autonomous vehicle.

Figure 6:
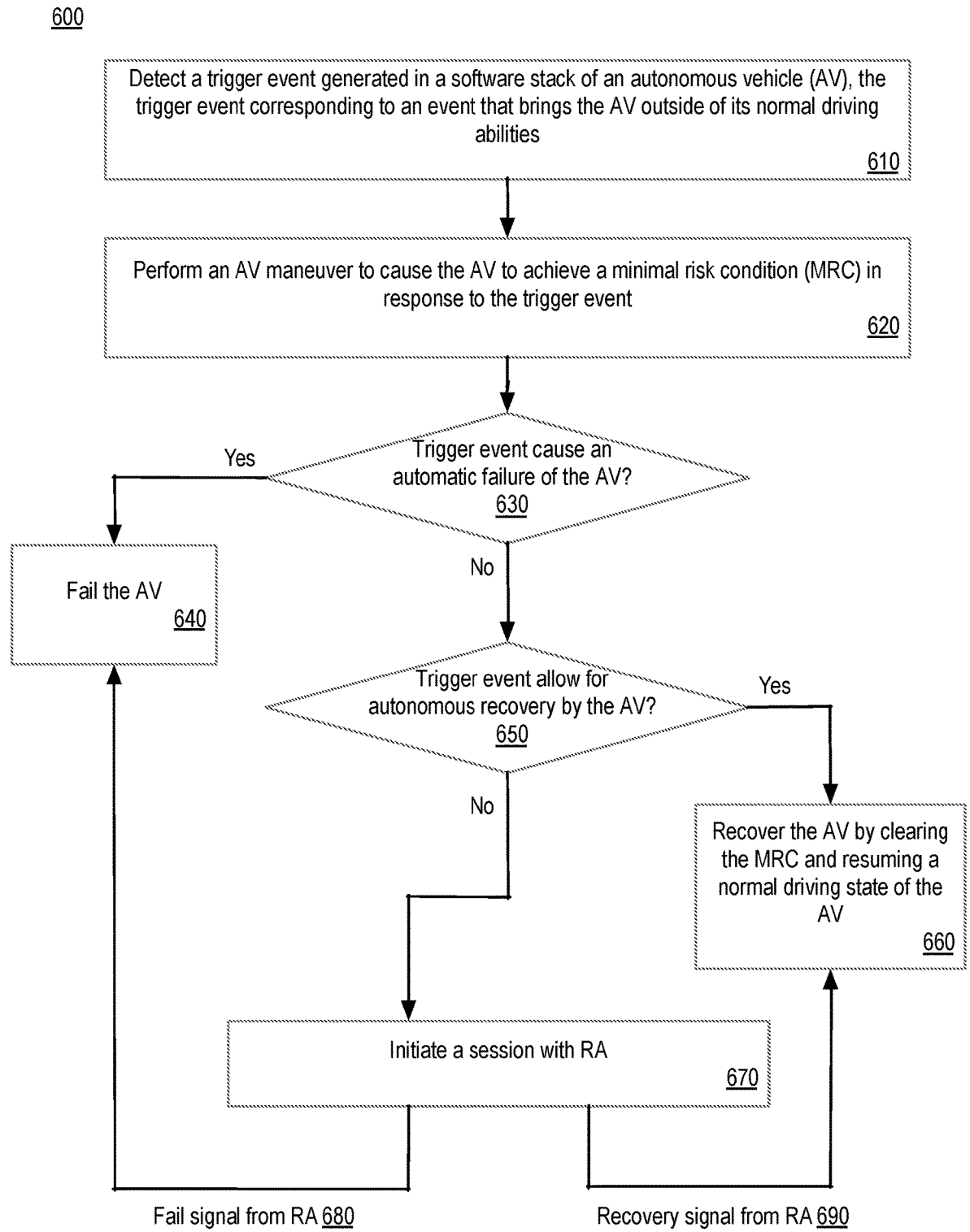
FIG. 6 illustrates an example method for recovering or failing an autonomous vehicle in response to a trigger event for unsupported or degraded conditions of an autonomous vehicle.

FIG. 6 illustrates an example method 600 for recovering or failing an autonomous vehicle in response to a trigger event for unsupported or degraded conditions of an autonomous vehicle. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some embodiments, the method 600 includes block 610 where a trigger event generated in a software stack of an autonomous vehicle is detected. In one embodiment, the trigger events corresponds to events that bring the autonomous vehicle outside of its normal driving abilities. For example, the trigger events indicate unsupported or degraded conditions that bring the autonomous vehicle outside of allowable driving conditions of the autonomous vehicle. In some embodiments, the trigger events include one or more of determined weather conditions, collisions, software errors, exiting a range of a geographic fence of the autonomous vehicle, cabin tampering, open doors, unbuckled seat belts, passenger end ride indications, or cybersecurity integrity monitoring, to name a few examples.

Then, at block 620, an autonomous vehicle maneuver is performed to cause the autonomous vehicle to achieve an MRC in response to the trigger event. At decision block 630, it is determined whether the trigger event causes an automatic failure of the autonomous vehicle. In one embodiment, a determined set of trigger events are classified as causing immediate failure of the autonomous vehicle. If so, method 600 proceeds to block 640, where the autonomous vehicle fails. In one embodiment, failing the autonomous vehicle comprises rendering the autonomous vehicle as inoperable.

If the trigger event does not cause automatic failure of the autonomous vehicle at decision block 630, then method 600 proceeds to decision block 650. At decision block 650, it is determined whether the trigger event allows for autonomous recovery by the autonomous vehicle. In one embodiment, a determined set of trigger events are classified as allowing for autonomous recovery of the autonomous vehicle (without contacting RA). If so, then method 600 proceeds to block 660, where the autonomous vehicle is recovered by clearing the MRC and resuming a normal driving state of the autonomous vehicle.

If the trigger event does not allow for autonomous recovery by the autonomous vehicle, then method 600 proceeds to block 670 where a session is initiated with RA. In some embodiments, the session with the RA is initiated upon occurrence of the trigger event, without regard to whether an automatic failure is indicated or automatic recovery is allowed.

As a result of the session with the RA, either a fail signal 680 or a recovery signal 690 can be issued by the RA. If a fail signal is issued by the RA 680, the method 600 proceeds to block 640 where the autonomous vehicle is failed. On the other hand, if a recovery signal is issued by the RA 690, then method 600 proceeds to block 660 where the autonomous vehicle is recovered by clearing the MRC and resuming a normal driving state of the autonomous vehicle.

Figure 7:
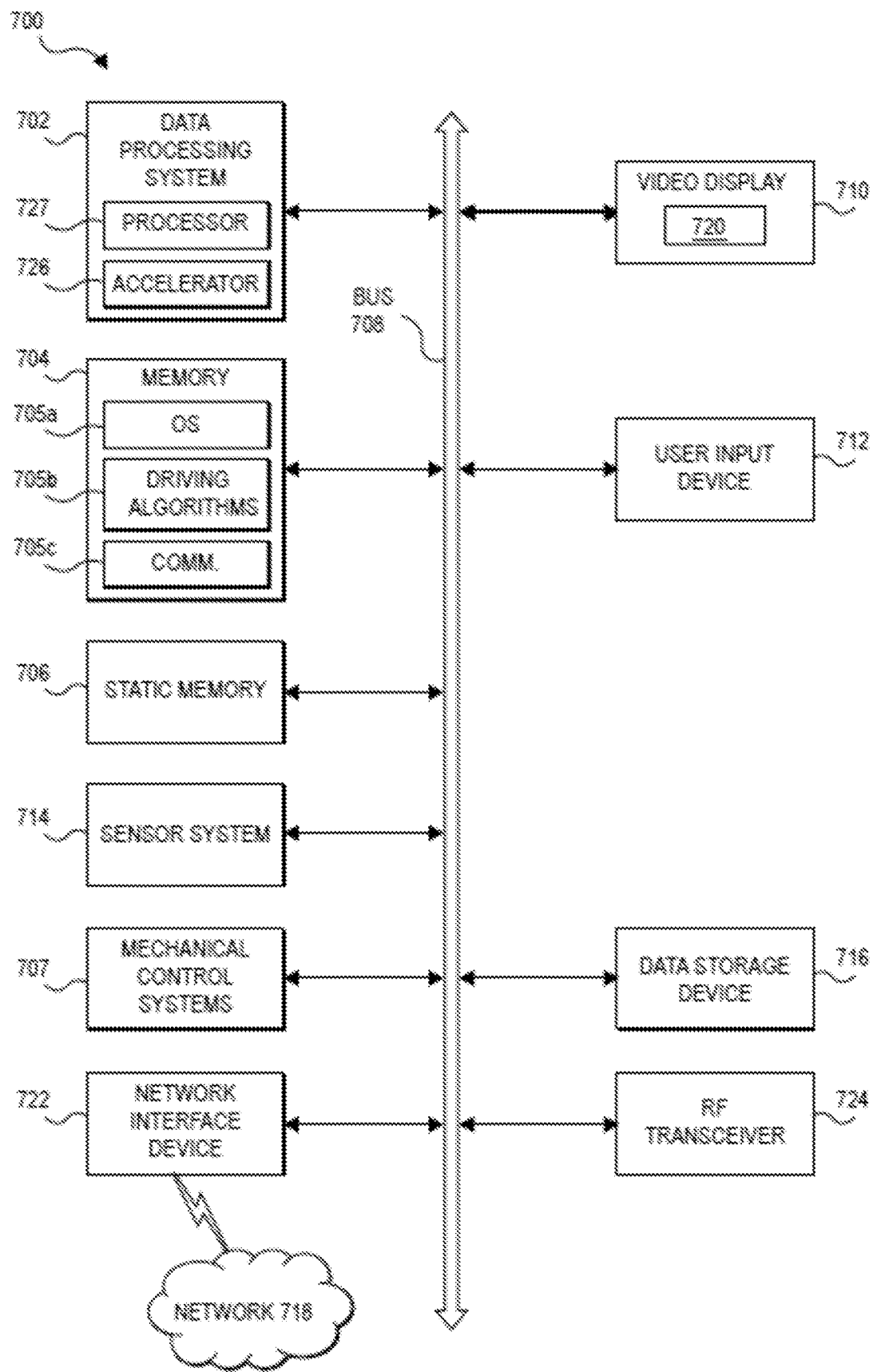
FIG. 7 illustrates a diagram of a vehicle having driver assistance according to embodiments herein.

FIG. 7 is a block diagram of a vehicle 700 having driver assistance according to embodiments herein. Within the processing system 702 (or computer system 702) is a set of instructions for causing the machine to perform any one or more of the methodologies discussed herein including machine learning operations for object detection and part segmentation. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, event producer, distributed node, centralized system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The processing system 702, as disclosed above, includes processing logic in the form of a general purpose instruction-based processor 727 or an accelerator 726 (e.g., graphics processing units (GPUs), FPGA, ASIC, etc.)). The general purpose instruction-based processor may be one or more general purpose instruction-based processors or processing devices (e.g., microprocessor, central processing unit, or the like). More particularly, processing system 702 may be a complex instruction set computing (CISC) microprocessor, reduced instruction set computing (RISC) microprocessor, very long instruction word (VLIW) microprocessor, general purpose instruction-based processor implementing other instruction sets, or general purpose instruction-based processors implementing a combination of instruction sets. The accelerator may be one or more special-purpose processing devices such as an application specific integrated circuit (ASIC), a field programmable gate array (FPGA), a digital signal general purpose instruction-based processor (DSP), network general purpose instruction-based processor, many light-weight cores (MLWC) or the like.

Processing system 702 is configured to perform the operations and methods discussed herein. The example vehicle 700 includes a processing system 702, main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 716 (e.g., a secondary memory unit in the form of a drive unit, which may include fixed or removable computer-readable storage medium or computer-readable medium), which communicate with each other via a bus 708. The storage units disclosed herein may be configured to implement the data storing mechanisms for performing the operations and methods discussed herein. Memory 706 can store code and/or data for use by processor 727 or accelerator 726. Memory 706 include a memory hierarchy that can be implemented using any combination of RAM (e.g., SRAM, DRAM, DDRAM), ROM, FLASH, magnetic and/or optical storage devices. Memory may also include a transmission medium for carrying information-bearing signals indicative of computer instructions or data (with or without a carrier wave upon which the signals are modulated).

Processor 727 and accelerator 726 execute various software components stored in memory 704 to perform various functions for system 702. Furthermore, memory 706 may store additional modules and data structures not described above.

Operating system 705*a* includes various procedures, sets of instructions, software components and/or drivers for controlling and managing general system tasks and facilitates communication between various hardware and software components. Driving algorithms 705*b* (e.g., method, object detection, driver assistance, etc.) utilize sensor data from the sensor system 714 to provide object detection (such as trigger event detection for responding to unsupported or degraded conditions), segmentation, driver assistance features, and tire road friction limit nearness estimation for different applications such as driving operations of vehicles. A communication module 705*c* provides communication with other devices utilizing the network interface device 722 or RF transceiver 724.

The vehicle 700 may further include a network interface device 722. In an alternative embodiment, the data processing system disclosed is integrated into the network interface device 722 as disclosed herein. The vehicle 700 also may include a video display unit 710 (e.g., a liquid crystal display (LCD), LED, or a cathode ray tube (CRT)) connected to the computer system through a graphics port and graphics chipset, an input device 712 (e.g., a keyboard, a mouse), and a Graphic User Interface (GUI) 720 (e.g., a touch-screen with input & output functionality) that is provided by the display 710.

The vehicle 700 may further include a RF transceiver 724 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The data storage device 716 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the main memory 704 and/or within the data processing system 702, the main memory 704 and the data processing system 702 also constituting machine-readable storage media.

In one example, the vehicle 700 with driver assistance is an autonomous vehicle that may be connected (e.g., networked) to other machines or other autonomous vehicles using a network 718 (e.g., LAN, WAN, cellular network, or any network). The vehicle can be a distributed system that includes many computers networked within the vehicle. The vehicle can transmit communications (e.g., across the Internet, any wireless communication) to indicate current conditions (e.g., an alarm collision condition indicates close proximity to another vehicle or object, a collision condition indicates that a collision has occurred with another vehicle or object, etc.). The vehicle can operate in the capacity of a server or a client in a client-server network environment, or as a peer machine in a peer-to-peer (or distributed) network environment. The storage units disclosed in vehicle 700 may be configured to implement data storing mechanisms for performing the operations of autonomous vehicles.

The vehicle 700 also includes sensor system 714 and mechanical control systems 707 (e.g., chassis control, vehicle propulsion system, driving wheel control, brake control, etc.). The system 702 executes software instructions to perform different features and functionality (e.g., driving decisions) and provide a graphical user interface 720 for an occupant of the vehicle. The system 702 performs the different features and functionality for autonomous operation of the vehicle based at least partially on receiving input from the sensor system 714 that includes lidar sensors, cameras, radar, GPS, and additional sensors. The system 702 may be an electronic control unit for the vehicle.

The above description of illustrated implementations of the embodiments herein, including what is described in the Abstract, is not intended to be exhaustive or to limit the embodiments herein to the precise forms disclosed. While specific implementations of, and examples for, the embodiments are described herein for illustrative purposes, various equivalent modifications are possible within the scope of the embodiments herein, as those skilled in the relevant art will recognize.

These modifications may be made to the embodiments herein in light of the above detailed description. The terms used in the following claims should not be construed to limit the embodiments to the specific implementations disclosed in the specification and the claims. Rather, the scope of the embodiments is to be determined entirely by the following claims, which are to be construed in accordance with established doctrines of claim interpretation.

The invention claimed is:

1. A method performed by an autonomous vehicle, the method comprising:
    aggregating one or more trigger events generated across a software stack of the autonomous vehicle (AV) as aggregated trigger events, the one or more trigger events indicating at least one of unsupported or degraded conditions that bring the AV outside of allowable driving conditions of the AV;
    ranking, by the software stack of the AV, the aggregated trigger events in accordance with priority levels corresponding to the aggregated trigger events;
    determining, by the software stack of the AV, an AV maneuver to respond to a selected trigger event, wherein the selected trigger event is a highest ranked trigger event of the aggregated trigger events;
    causing, by the software stack of the AV, the AV maneuver to be performed by the AV using, based on the AV maneuver, one or more of a primary planning system of the software stack of the AV and a secondary planning stack of the software stack of the AV, which provides fewer capabilities than the primary planning stack; and
    determining, by the software stack of the AV, whether to cause the AV to enter a failure state or cause the AV to recover to a normal driving state in response to the selected trigger event.

2. The method of claim 1, wherein the one or more trigger events comprise determined weather conditions, collisions, software errors, exiting a range of a geographic fence of the AV, cabin tampering, open doors, unbuckled seat belts, passenger end ride indications, or cybersecurity integrity monitoring.

3. The method of claim 1, wherein determining the AV maneuver to respond to the selected trigger event further comprises identifying the AV maneuver as a hard coded response to the selected trigger event, and wherein one or more other AV maneuvers are hard coded as responses to other trigger events of the AV.

4. The method of claim 1, wherein the AV maneuver comprises one or more of an immediate pullover, an immediate stop, a secondary stop, or a hard stop.

5. The method of claim 1, wherein the AV maneuver is defined as a scenario, and wherein the scenario comprises an encoding of a representation of a response the AV performs to effectuate the AV maneuver.

6. The method of claim 1, further comprising initiating a session with remote assistance (RA) in response to the selected trigger event not causing an automatic failure of the AV and in response to the selected trigger event not allowing for an autonomous recovery of the AV, wherein the session with the RA is to analyze the selected trigger event and the AV maneuver in order for the RA to provide a decision to the AV on how to proceed.

7. The method of claim 6, further comprising determining to fail the AV based on at least one of the selected trigger event causing an automatic failure of the AV or receiving a fail signal from the session with the RA.

8. The method of claim 6, further comprising determining to recover the AV to the normal driving state based on at least one of the selected trigger event allowing for an autonomous recovery of the AV or receiving a recovery signal from the session with the RA.

9. The method of claim 8, wherein causing the AV to recover to the normal driving state comprises clearing a minimal risk condition (MRC) of the AV to allow the AV to resume the normal driving state.

10. An apparatus comprising:
    at least one memory; and
    at least one processor coupled to the at least one memory, wherein the at least one processor is to:
        aggregate one or more trigger events generated across a software stack of an autonomous vehicle (AV) as aggregated trigger events, the one or more trigger events indicating at least one of unsupported or degraded conditions that bring the AV outside of allowable driving conditions of the AV;
        rank, by the software stack of the AV, the aggregated trigger events in accordance with priority levels corresponding to the aggregated trigger events;
        determine, by the software stack of the AV, an AV maneuver to respond to a selected trigger event, wherein the selected trigger event is a highest ranked trigger event of the aggregated trigger events;
        cause, by the software stack of the AV, the AV maneuver to be performed by the AV using, based on the AV maneuver, one or more of a primary planning system of the software stack of the AV and a secondary planning stack of the software stack of the AV, which provides fewer capabilities than the primary planning stack; and
        determine, by the software stack of the AV, whether to cause the AV to enter a failure state or cause the AV to recover to a normal driving state in response to the selected trigger event.

11. The apparatus of claim 10, wherein the one or more trigger events comprise determined weather conditions, collisions, software errors, exiting a range of a geographic fence of the AV, cabin tampering, open doors, unbuckled seat belts, passenger end ride indications, or cybersecurity integrity monitoring.

12. The apparatus of claim 10, wherein determining the AV maneuver to respond to the selected trigger event further comprises identifying the AV maneuver as a hard coded response to the selected trigger event, and wherein one or more other AV maneuvers are hard coded as responses to other trigger events of the AV.

13. The apparatus of claim 10, wherein the AV maneuver comprises one or more of an immediate pullover, an immediate stop, a secondary stop, or a hard stop.

14. The apparatus of claim 10, wherein the AV maneuver is defined as a scenario, and wherein the scenario comprises an encoding of a representation of a response the AV performs to effectuate the AV maneuver.

15. The apparatus of claim 10, further comprising initiating a session with remote assistance (RA) in response to the selected trigger event not causing an automatic failure of the AV and in response to the selected trigger event not allowing for an autonomous recovery of the AV, wherein the session with the RA is to analyze the selected trigger event and the AV maneuver in order for the RA to provide a decision to the AV on how to proceed.

16. A non-transitory computer-readable medium having stored thereon instructions that, when executed by one or more processors, cause the one or more processors to:
    aggregate one or more trigger events generated across a software stack of an autonomous vehicle (AV) as aggregated trigger events, the one or more trigger events indicating at least one of unsupported or degraded conditions that bring the AV outside of allowable driving conditions of the AV;
    rank, by the software stack of the AV, the aggregated trigger events in accordance with priority levels corresponding to the aggregated trigger events;
    determine, by the software stack of the AV, an AV maneuver to respond to a selected trigger event, wherein the selected trigger event is a highest ranked trigger event of the aggregated trigger events;
    cause, by the software stack of the AV, the AV maneuver to be performed by the AV using, based on the AV maneuver, one or more of a primary planning system of the software stack of the AV and a secondary planning stack of the software stack of the AV, which provides fewer capabilities than the primary planning stack; and
    determine, by the software stack of the AV, whether to cause the AV to enter a failure state or cause the AV to recover to a normal driving state in response to the selected trigger event.

17. The non-transitory computer-readable medium of claim 16, wherein the one or more trigger events comprise determined weather conditions, collisions, software errors, exiting a range of a geographic fence of the AV, cabin tampering, open doors, unbuckled seat belts, passenger end ride indications, or cybersecurity integrity monitoring.

18. The non-transitory computer-readable medium of claim 16, wherein determining the AV maneuver to respond to the selected trigger event further comprises identifying the AV maneuver as a hard coded response to the selected trigger event, and wherein one or more other AV maneuvers are hard coded as responses to other trigger events of the AV.

19. The non-transitory computer-readable medium of claim 16, further comprising initiating a session with remote assistance (RA) in response to the selected trigger event not causing an automatic failure of the AV and in response to the selected trigger event not allowing for an autonomous recovery of the AV, wherein the session with the RA is to analyze the selected trigger event and the AV maneuver in order for the RA to provide a decision to the AV on how to proceed.

* * * * *